United States Patent
Streid et al.

(10) Patent No.: US 7,012,669 B2
(45) Date of Patent: Mar. 14, 2006

(54) REFLECTION BARRIER FOR PANORAMIC DISPLAY

(75) Inventors: Harry Streid, Salt Lake City, UT (US); Rob Christensen, Salt Lake City, UT (US); Allen H. Tanner, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 136 days.

(21) Appl. No.: 10/796,556

(22) Filed: Mar. 9, 2004

(65) Prior Publication Data

US 2005/0041211 A1    Feb. 24, 2005

Related U.S. Application Data

(63) Continuation-in-part of application No. 10/642,880, filed on Aug. 18, 2003, now Pat. No. 6,871,958.

(51) Int. Cl.
*G03B 37/00* (2006.01)
*G03B 21/56* (2006.01)

(52) U.S. Cl. .......................................... 352/69; 359/451
(58) Field of Classification Search .................. 352/40, 352/41, 69, 71, 85; 359/449, 450, 451, 453, 359/460; 396/427
See application file for complete search history.

(56) References Cited

U.S. PATENT DOCUMENTS

| | | | |
|---|---|---|---|
| 3,201,797 A | 8/1965 | Roth | |
| 3,370,505 A | 2/1968 | Bryan | |
| 3,734,605 A | 5/1973 | Vevick | |
| 3,785,715 A | 1/1974 | Mecklenborg | |
| 4,100,571 A | 7/1978 | Dykes et al. | |
| 4,170,400 A | 10/1979 | Bach et al. | |
| 4,390,253 A | 6/1983 | Lobb | |
| 4,427,274 A | 1/1984 | Pund et al. | |
| 5,023,725 A | 6/1991 | McCutchen | |
| 5,300,942 A | 4/1994 | Dolgoff | |
| 5,500,747 A | 3/1996 | Tanide et al. | |
| 5,566,370 A | 10/1996 | Young | |
| 5,818,998 A | 10/1998 | Harris et al. | |
| 6,042,238 A | 3/2000 | Blackham et al. | |
| 6,219,015 B1 | 4/2001 | Bloom et al. | |
| 6,375,366 B1 * | 4/2002 | Kato et al. .................. | 396/351 |
| 6,480,634 B1 | 11/2002 | Corrigan | |
| 6,511,182 B1 | 1/2003 | Agostinelli et al. | |
| 2002/0067467 A1 | 6/2002 | Dorval et al. | |
| 2002/0146248 A1 * | 10/2002 | Herman et al. ............. | 396/427 |

FOREIGN PATENT DOCUMENTS

WO    WO 02/12925 A2    2/2002

* cited by examiner

*Primary Examiner*—Rodney Fuller
(74) *Attorney, Agent, or Firm*—Thorpe North & Western LLP

(57) ABSTRACT

A panoramic display system includes a curved projection screen, a panoramic projector, and a substantially conically shaped barrier. The projector is configured to project an image onto the projection screen from a projection point located substantially above the projection screen. The conical barrier has a base disposed toward the bottom of the projection screen, and an apex region disposed toward the projection point. The barrier blocks scattered light from reflecting from portions of the curved screen to other portions thereof.

24 Claims, 9 Drawing Sheets

REFLECTION BARRIER FOR PANORAMIC DISPLAY

The present application is a continuation-in-part of U.S. patent application Ser. No. 10/642,880 filed on Aug. 18, 2003 now U.S. Pat. No. 6,871,958 and entitled WIDE ANGLE SCANNER FOR PANORAMIC DISPLAY.

BACKGROUND OF THE INVENTION

1. Field of the Invention

The present invention relates generally to panoramic visual display systems. More particularly, the present invention relates to a barrier for reducing light scattering on a panoramic display screen.

2. Related Art

A panoramic display is generally considered one in which the horizontal dimension is much greater than the vertical dimension, such that the display horizontally wraps around the viewing point, at least partially. Panoramic visual display systems are desirable in a number of applications. One particular application needing wide fields of view is flight simulation and training. Heretofore, panoramic flight simulator visual display systems have typically used multiple projectors, with their separate images edge-blended in a mosaic to create an apparently continuous wide field of view. Anywhere from three to ten or more individual projectors are commonly used, and multiple projector displays with 64 or more separate projectors have been proposed to meet the need for high resolution imagery over a very wide field of view.

Two types of such displays have frequently been used in simulation and training. The first type, shown in FIG. 13, comprises a panoramic real image display system 100, wherein a projected real image 102 is viewed by an observer from a viewing point 106 near the center of a curved front projection screen 108, in this case a dome. In such a system, multiple projectors 110 are typically located above and/or behind the viewer, preferably outside of view. For very large fields of view, a nearly complete dome display screen is used, as shown. However, it becomes increasingly difficult with increasing field of view to place projectors in locations that provide uniform illumination and resolution, yet are still hidden from view. In addition, current methods for blending the edges of images from adjacent projectors are not completely effective at hiding the seams between images, and color matching of adjacent images from multiple projectors is very difficult. The common result is composite images with noticeable seams and inconsistent coloring from one portion of the image to another.

Another frequently used display type is a wide angle virtual display 112, shown in FIGS. 14 and 15. This type of display is frequently used for civil aviation simulators. In this type of display, an observer views a concave mirror 114 which provides a reflection of an image that has been projected onto a back-projection screen 116. The object for the collimating mirror is a real image projected by multiple projectors 118. In this system both the projectors and the eyepoint 120 (inside the simulator cockpit 122) are offset from the center of curvature 126 of the screen, and the center of curvature 124 of the mirror.

The geometry shown in FIGS. 14 and 15 creates problems for projectors in general and for panoramic displays with multiple projectors in particular. As illustrated in FIG. 15, there is a single point 130 in space that is preferred by an optical projection system for directing the greatest amount of light toward the viewing location 120. Ideally, all of the light would be projected downward and around from this point to all areas of the projection screen 116. However, it is impossible to locate multiple projectors at a single point in space. Additionally, the low f-number lenses required for CRT projectors normally used do not have sufficient depth of focus to allow positioning at the preferred location 130. Also, large projectors in these positions are problematic for training applications that use motion bases. The large mass of multiple projectors placed high above the screen creates an unacceptably large moment of inertia for simulators or other applications incorporating motion systems. For these reasons, current wide-angle virtual systems, such as that shown in FIG. 14, have projectors located in a compromised position below and behind the ideal location.

A laser projector can have sufficient depth of focus to project from the ideal point well above the screen, but it must be scanned with a significant downward tilt relative to the vertical axis of the screen. The type of scanner that has been used with laser projectors in the past is not capable of the wide angle, tilted scan required for both a wide angle virtual display and a panoramic real image display.

Panoramic scanners have been developed for linear detector arrays. In prior systems, wide angle scanning of a linear (or two dimensional) array of sensors or light modulators is usually done with a mirror or prism at a 45 degree angle to an axis of rotation that is perpendicular to the axis (or plane) of the sensor. Since such an arrangement causes the projected or sensed image to roll through 360 degrees for each revolution of the scanning element as it is rotated, such scanners normally incorporate a doubly reflecting mirror system or prism rotating at half the scanner rate to restore the image to the proper orientation. These systems provide a full 360 degree scan, but require an image derotator turning continuously at one half the scan rate. Since such systems require dynamic synchronization of two elements rotating at different rates while maintaining precise optical alignment through multiple reflections, they are expensive to produce, suffer from accuracy problems, and are heavy and difficult to balance. Consequently, they are seldom used for high speed scanning systems.

In the past, laser projectors have only had the capability to scan a single beam of light over a narrow angle while modulating it one pixel at a time to create a projected raster. There are many types of laser projectors that scan a single beam in a raster fashion, such as using a rotating polygon wheel for a fast axis, and a galvanometer for a slow axis. This type of projector is limited in image size vs. projection distance, and therefore creates a narrow image. These types of projectors sometimes use a magnifying lens to shorten the throw distance. This method is unsuitable for a panoramic display because it magnifies the pixels in both the horizontal and vertical directions. Additionally, bandwidth limitations have hindered the development of a high resolution panoramic display from a single projector modulating a single laser beam.

One method of scanning a linear array to form an image uses a grating light valve (GLV) to project a linear array over a narrow field of view on a flat screen. Unfortunately, mere use of a GLV does not address the problem of creating a panoramic display on a curved screen. Prior systems for wide angle image projection also include head-mounted laser projectors incorporating a line scanner. This type of system scans a 1-dimensional image over a relatively limited field of view. Since there is no offset, the scanner must be mounted at the viewing position (e.g. on a helmet).

One problem frequently encountered with panoramic display systems, whether real or virtual, is light scattering. As shown in FIG. 1, some portion of the light that strikes one area of a curved screen 14 tends to scatter and reflect toward other parts of the screen, as indicated by arrows 198. This scattered light tends to wash out the image, and reduce the contrast of the display. Obviously, this adversely affects the quality of the image.

SUMMARY OF THE INVENTION

It has been recognized that it would be advantageous to develop a direct view display system that can project a wide field of view from a single projection location that is more nearly optimized for a uniform display, and provides good color matching and no seams.

It has also been recognized that it would be advantageous to develop a system and method for reducing light scattering with a panoramic display system.

The invention advantageously provides a wide angle display system including a linear array projector, a curved display surface, and a substantially planar scanning mirror. The linear array projector is configured to project an image along an optical axis toward the scanning mirror. The scanning mirror is configured to continuously rotate about an axis substantially in the plane of the mirror, and to reflect the image onto the display surface.

In accordance with another more detailed aspect of the present invention, the scanning mirror includes two parallel, opposing reflective sides, and rotates at one half the refresh rate of the projector.

In accordance with yet another more detailed aspect of the present invention, the linear array projector is configured to project an image comprising a series of lines of pixels, and the rotational axis of the scanning mirror is parallel to the lines of pixels. The scanning mirror is configured to reflect the lines of pixels onto and scan the image across the curved display surface.

In accordance with another embodiment of the invention, the system can comprise multiple linear array projectors projecting images at the scanning mirror, so as to produce a composite panoramic image on the display surface.

In accordance with still another more detailed aspect of the present invention, the system can comprise a polygonal scanning mirror with a plurality of vertical reflective faces, configured to reflect images from a plurality of linear array projectors.

In accordance with another aspect thereof, the invention advantageously provides a panoramic display system, comprising a curved projection screen, having a center of curvature and a bottom, a panoramic projector, configured to project an image onto the projection screen from a projection point located substantially above the projection screen, and a substantially conically shaped barrier, having a base disposed toward the bottom of the projection screen, and an apex region disposed toward the projection point. The barrier blocks scattered light from reflecting from portions of the screen to other portions thereof.

Additional features and advantages of the invention will be apparent from the detailed description which follows, taken in conjunction with the accompanying drawings, which together illustrate, by way of example, features of the invention.

DETAILED DESCRIPTION

Figure 1:
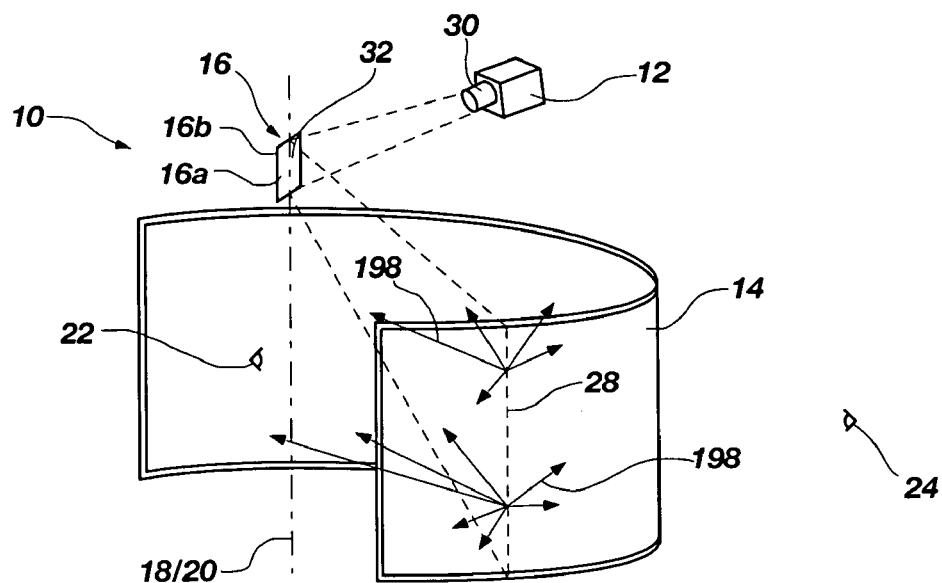
FIG. 1 is a perspective view of one embodiment of a wide angle scanner in accordance with the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The inventors have developed a new type of laser scanner for surrounding a viewer with a panoramic image. For purposes of this discussion, the terms "panoramic image" and "panoramic display" are used to refer to a display or image in which the horizontal dimension is much greater than the vertical dimension. It will be apparent that "horizontal" and "vertical" are relative terms. They do not refer to any particular relationship to the earth's horizon, but refer to arbitrary orthogonal axes. The importance of the vertical relative to the horizontal will become more apparent from the discussion below.

For direct view display systems, it is desirable to project a wide field of view from a common location, which is more nearly optimized for a uniform display and provides good color uniformity, without seams. For a system like that shown in FIG. 13, the preferred projector location to meet these requirements would be somewhere near the center of the dome, but behind and above the viewing point 106. A similar system would be desirable for wide angle virtual systems, such as that shown in FIGS. 14 and 15, where the viewing point 120 is offset from the optical axis of a screen and mirror.

Figure 13:
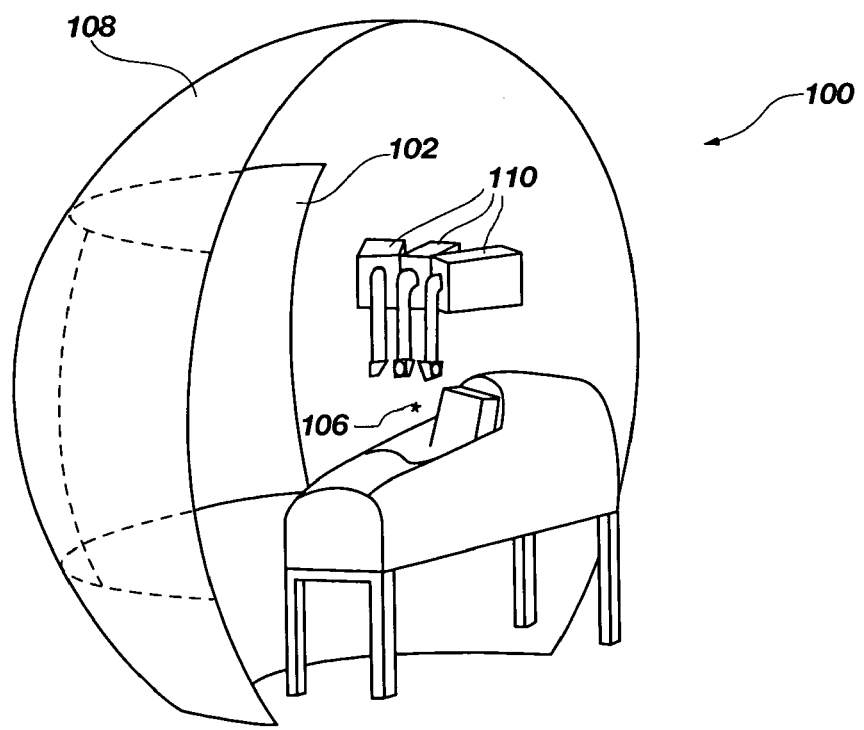
FIG. 13 is a pictorial view of a prior art flight simulator employing a real image display using multiple projectors for producing a panoramic image on the inside of a dome display surface.
Figure 14:
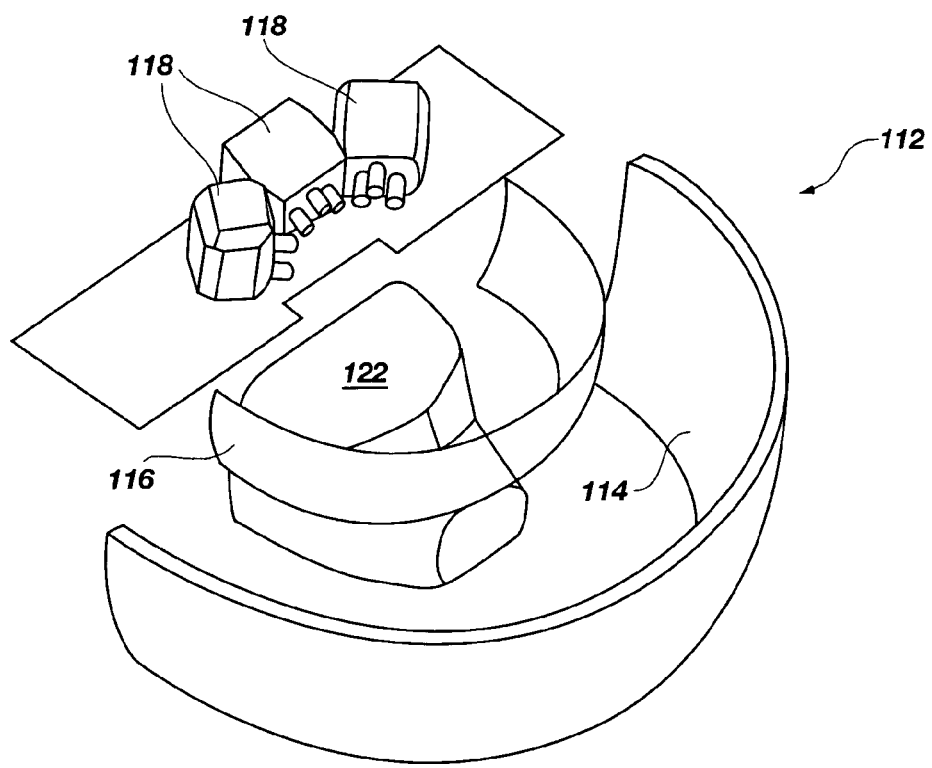
FIG. 14 is a pictorial view of a prior art flight simulator employing multiple projectors for producing a panoramic virtual image.
Figure 15:
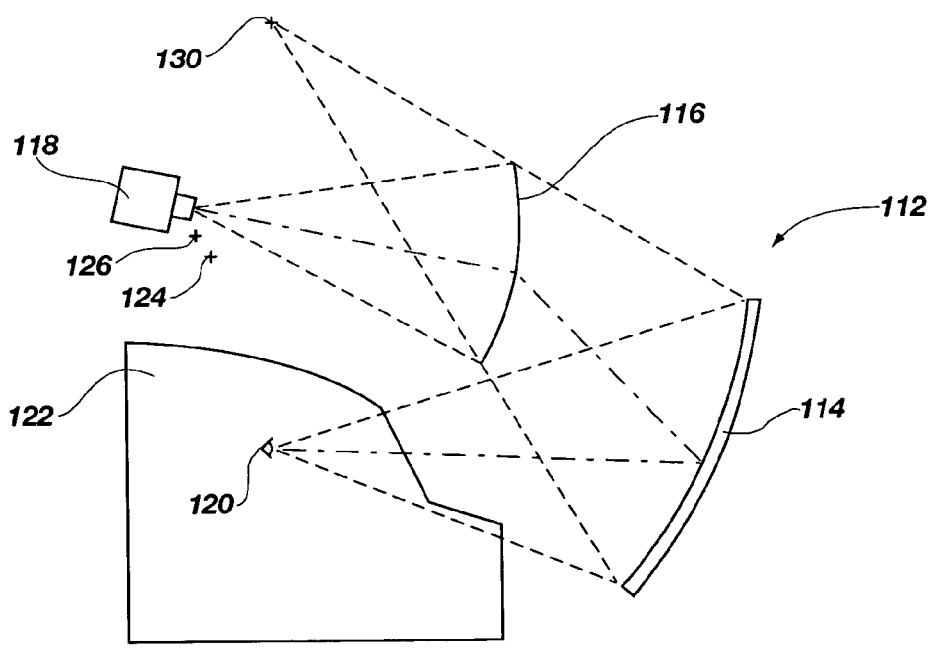
FIG. 15 is an elevational view of the flight simulator of FIG. 14.

The present invention addresses these issues by projecting a vertical column of pixels created by a linear array spatial light modulator as the image source. This column of pixels is scanned across a wide angle to create a panoramic field of view, with the scanner located above and behind the viewing point. This offset geometry creates problems for projectors in general and for panoramic displays using multiple projectors in particular. In general, projectors should be located close to the viewing point for best brightness and contrast. This becomes difficult when multiple projectors are used, as shown in FIGS. 13 and 14. The wide angle laser scanner of the present invention addresses these problems.

Figure 2:
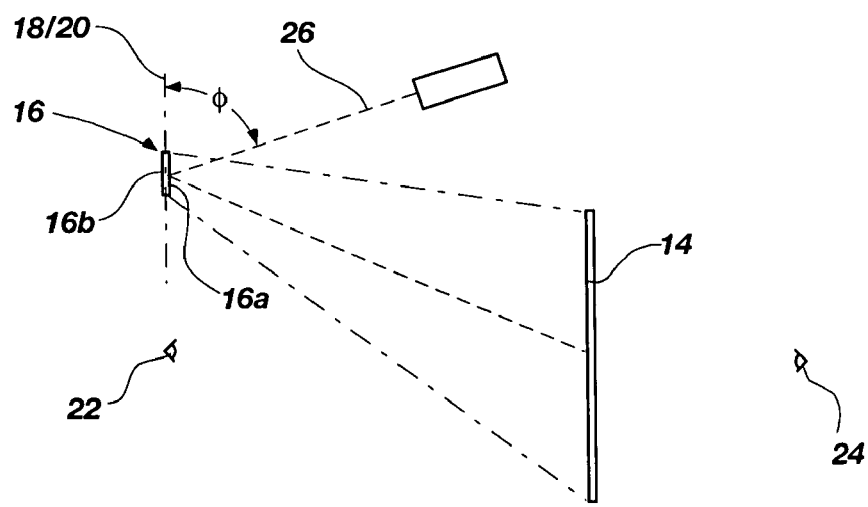
FIG. 2 is an elevational view of the wide angle scanner of FIG. 1.

FIGS. 1 and 2 show one embodiment of a panoramic real image display system 10 which the inventors have built in accordance with the present invention. This system comprises a linear array projector 12 (i.e. GLV projector), a curved display screen 14, and a flat (i.e. substantially planar) scanning mirror 16 having a rotational axis 18 in the plane of the mirror. The curved display screen has an axis or center of curvature 20. The rotational axis is parallel to and preferably collinear with the axis of curvature.

Figure 3:
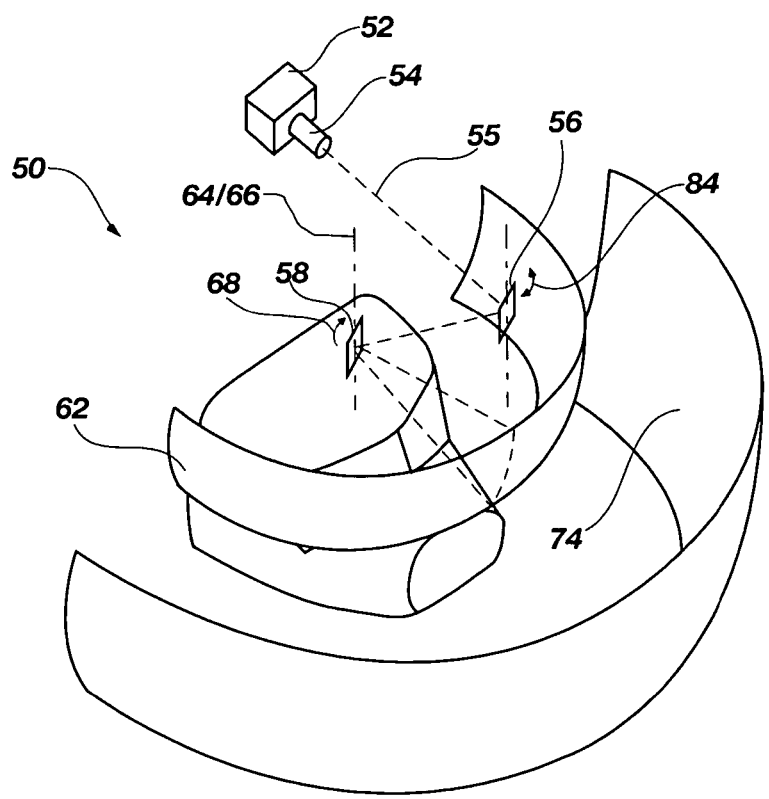
FIG. 3 is a perspective view of a wide angle virtual display flight simulator incorporating an alternative embodiment of wide angle scanner in accordance with the present invention.
Figure 4:
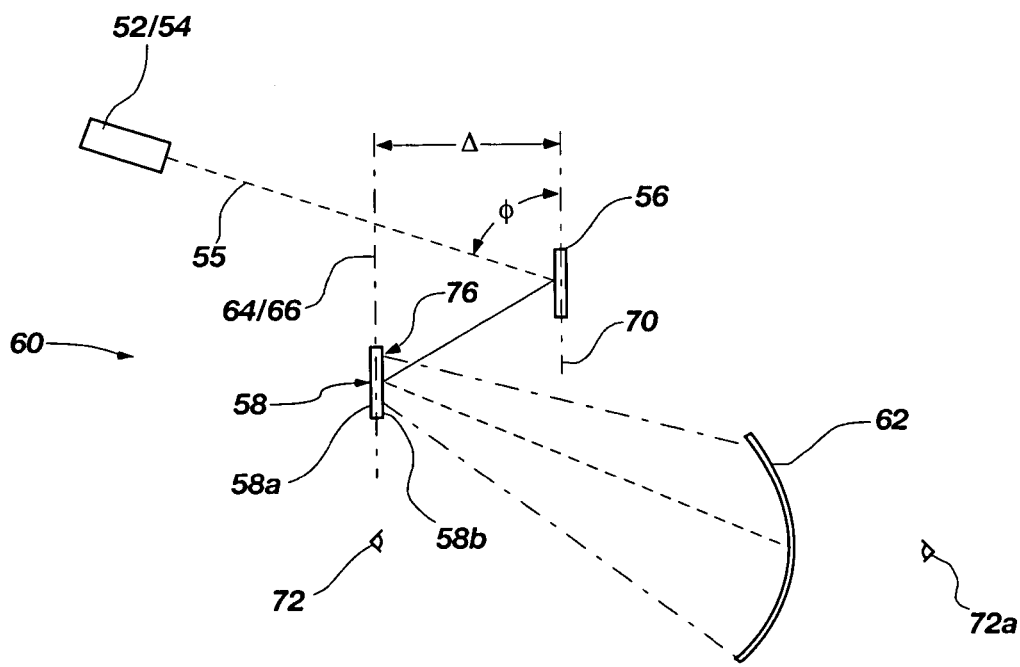
FIG. 4 is an elevational view of a wide angle real image display incorporating a wide angle scanner similar to that of FIG. 3.

The primary viewer location or eyepoint 22 is located below the scanning mirror 16 and approximately on the rotational axis/axis of curvature 18/20, viewing the concave side of the screen 14. However, the display screen could be a back projection screen, thus creating a secondary viewer location 24 viewing the convex side of the curved screen. While the screen shown in FIGS. 1 and 2 is curved about a single axis (i.e. the screen forming a portion of a cylinder), this embodiment of the invention could also be used with a double-curved screen (i.e. the screen forming a portion of a sphere), as is depicted in FIGS. 3 and 4.

The linear array projector 12 projects an image along an optical axis 26 toward the scanning mirror 16, which reflects the image onto the screen 14. The optical axis is oblique to the rotational axis 18 of the scanning mirror. In order to scan a projected field that wraps around the eyepoint 22, the direction of projection must be at an oblique angle to the axis of rotation of the scanner. This is necessary in order for the light from the scanning mirror not to reflect back onto the projector as it scans through a continuous field of view. Otherwise, the body of the projector itself would cast a shadow on a portion of the screen. This also allows the scanner to be located at a position other than at the eyepoint of the panoramic real image display.

Advantageously, the invention does this without a separate derotating element. Instead, it scans a linear array over a panoramic field of view without a second derotating element turning at a different velocity from the scan. The projector is configured to produce the image by continuously scanning a vertical (rather than horizontal) line of pixels 28. The designation of "vertical" is relative to the orientation of the rotational axis 18 of the scanning mirror, which corresponds to the vertical dimension of the panoramic image, discussed above. The projected line of pixels is parallel to the rotational axis of the scanning mirror.

The scanning mirror 16 is configured to continuously rotate about its rotational axis 18 to reflect the image onto the screen 14. The image produced by the GLV projector 12 is continuously scanned at a refresh rate, such as 60 Hz. During each refresh cycle, the planar scanning mirror rotates through one half of a rotation, reflecting each scanned vertical line 28 of the image onto the screen at its proper location to reproduce the total image. The angular swing of the mirror causes the image to be projected across a very wide arc, resulting in a wide panoramic image. In one embodiment, the scanning mirror has two reflective sides, 16a, 16b, and rotates at a rate that is half the refresh rate (i.e. 30 Hz). This is possible because each side of the mirror scans the image across the screen during one refresh cycle of the projector, and then faces away during the next cycle.

The projector 12 has a projection lens 30 with an external pupil 32 to project the image of the vertical column of pixels 28. It will be assumed for the purpose of this discussion that the real image at this point consists of the vertical column of pixels that can be modulated as the scanner rotates to form a two-dimensional image on the screen 14. The scanning mirror 16 is preferably located at the position of the external pupil 32. This is done so that the image produced on the scanning mirror will be as small as possible, thus allowing use of a smaller mirror. The projection lens is oriented to produce an angle $\phi$ between the optical axis 26 and the axis of rotation 18 of the scanning mirror. The angle $\phi$ is chosen to achieve the proper offset of the projection point (i.e. location of the projector lens) versus the viewing point 22 for a real image display system. An angle of $\phi=55$ degrees has been used in this system, though other angles could also be used.

The scanning mirror 16 is the main scanning mechanism, driven continuously by a servomotor (not shown) which is phase-locked to the image update rate of the projector 12, typically 60 Hz. In one example, approximately 110 degrees of the continuous 360 degree rotation of the scanning mirror assembly is used for each side of the mirror assembly to create two continuous 220 degree scans relative to the eyepoint 22 on the viewing screen 14 for each rotation of the mirror. This requires a 30 Hz (1800 RPM) rotation rate of the scanning mirror.

Figure 7:
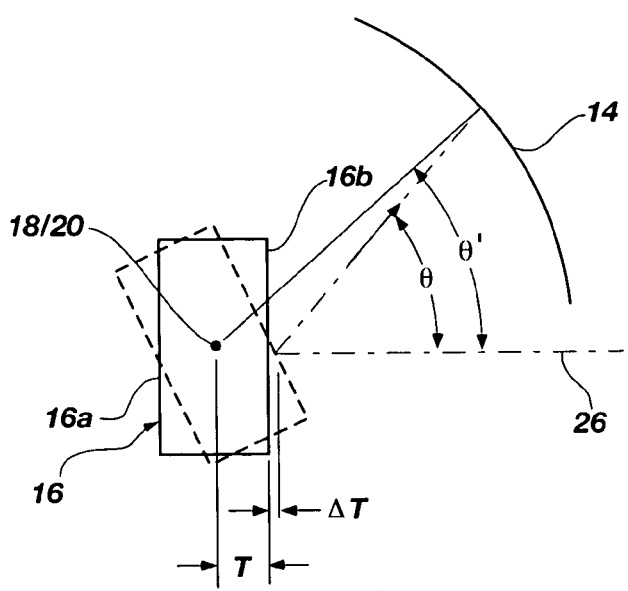
FIG. 7 is a top exaggerated view of a planar scanning mirror and curved screen, showing some effects of the mirror thickness relative to the position of projection on the display screen.
Figure 8:
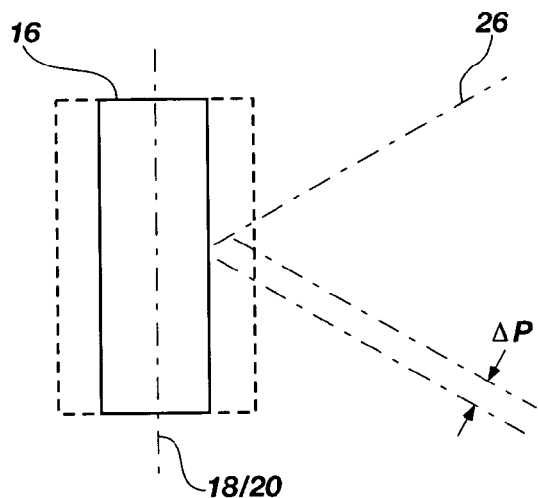
FIG. 8 is an exaggerated side view of a planar scanning mirror, showing some effects of the mirror thickness relative to apparent pixel size.
Figure 9:
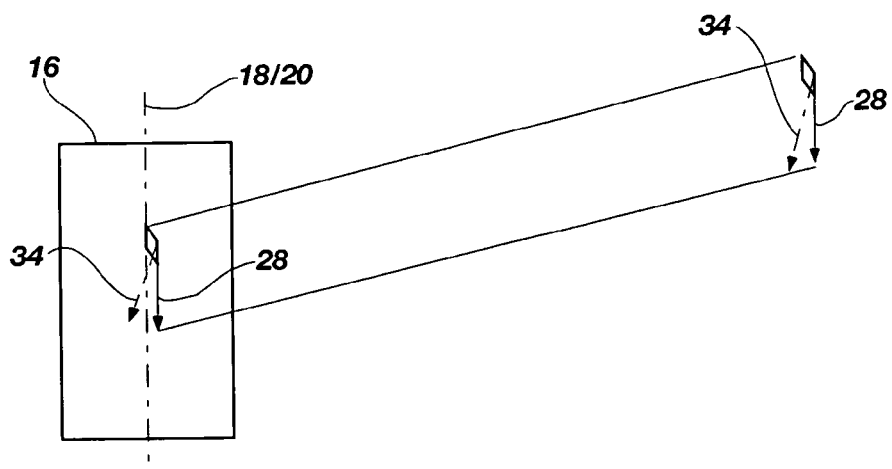
FIG. 9 is a diagram showing the effects of deviation of the pixel line from the vertical.

The rotating scanning mirror 16 presents certain technical considerations because of its rotation and because of its geometry. Some of these are illustrated in FIGS. 7–9. One consideration is the rotational motion of the mirror. As shown in FIG. 9, the oblique incidence of the projected image (line of pixels) 28 on the rotating mirror would normally cause the projected image to rotate, indicated by the dashed line 34. However, since the image formed by the GLV is essentially a vertical column of pixels of zero thickness, no image rotation occurs as long as the line of pixels is parallel to the axis of rotation 18 of the scanning mirror, and there is no component of the line image which is perpendicular to the axis of rotation of the scanning mirror.

Another consideration is the thickness of the mirror. As noted, the scanning mirror assembly 16 utilizes a two sided mirror. Since the mirror cannot have zero thickness, each scanning mirror surface has a small offset T (equal to half the total thickness of the mirror) from the axis of rotation 18, as shown in FIGS. 7 and 8. This offset causes the image to be slightly deflected both in the horizontal and in the vertical direction as the scanning mirror rotates. As shown in FIG. 7, if each mirror surface 16a, 16b of the scanning mirror is offset a distance T from the axis of rotation, the image source will intercept the mirror a distance ΔT closer as the mirror rotates from the normal position. As seen from the side view of FIG. 8, this will cause the image to be displaced in distance ΔP upwards on the screen to the left and right of the horizontal center of the screen. The inventors have calculated the magnitude of ΔP for various conditions, and have found that it is well within the error budget for both collimated and direct view display applications.

The mirror offset from the axis of rotation also causes a horizontal displacement of the image with rotation. As shown in FIG. 7, the image source intercepts the mirror surface 16a, 16b at a distance T from the axis of rotation and as the mirror rotates this distance is increased by ΔT. The inventors have found that the angular error E is less than 0.7 degrees for a mirror of 0.5" thickness and a screen having a 48" radius. This level of error is considered acceptable for most applications. Both horizontal and vertical errors can be set to zero in the forward field of view, and increasing to the values indicated at +/90 degrees of azimuth. If greater geometric accuracy is required, it can be obtained by performing Non-Linear Image Mapping (NLIM) in the image generator.

The oblique angle of incidence onto the projection screen also causes a top to bottom defocus of the image. Those skilled in the art will recognize that this can be corrected by a scheimpflug tilt of the GLV. Geometric correction for the image keystone and projection onto a spherical screen can also be performed by NLIM in the image generator.

Figure 5:
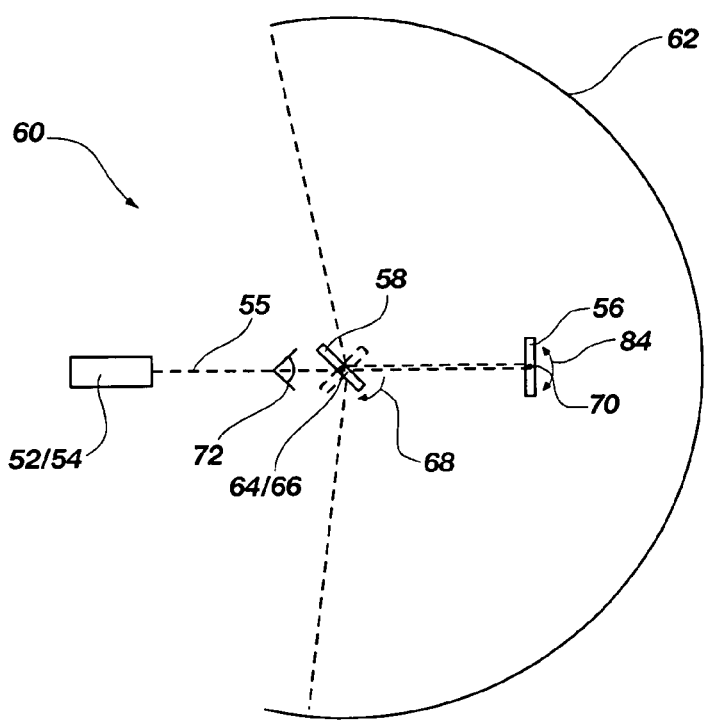
FIG. 5 is a top view of the wide angle scanner of FIG. 4.

Additional embodiments of wide angle displays in accordance with the invention are depicted in FIGS. 3–5. A wide angle virtual display 50 (similar to the configuration of FIG. 14) is shown in FIG. 3. A wide angle real image display 60 using the same type of projection system is depicted in FIG. 4, with FIG. 5 providing a plan view of this system. This embodiment of the projection system provides a panoramic display employing two mirrors, rather than just one. In this embodiment, the GLV projector 52 and projection lens 54 are essentially the same as in the embodiment of FIG. 1. The projector directs an image along an optical axis 55 toward a flat folding mirror 56. The folding mirror 56 reflects the image to the scanning mirror 58, which reflects the image to the curved projection screen 62. As with the embodiment of FIGS. 1 and 2, the projection lens 54 of the projector has an external pupil 76, and the scanning mirror 58 is preferably placed at the position of the external pupil so that the size of the projected rays on the mirror will be as small as possible. An external pupil is preferred, but lenses with an internal pupil can also be used, and simply require a larger mirror.

The scanning mirror 58 is located with its rotational axis 64 parallel to and preferably collinear with a vertical axis 66 (i.e. axis of curvature) of the curved projection screen 62. It will be apparent that a double-curved surface, such as the screen shown in FIG. 3, has an infinite number of axes of curvature. However, there is one preferred axis of curvature that is the axis of horizontal curvature with respect to the orientation of the panoramic image. In other words, an axis that is parallel to the vertical dimension of the image and represents the center of horizontal curvature of the screen is the desired axis of curvature.

The scanning mirror has two parallel reflective sides 58a, 58b, that are opposite each other and symmetrical about the axis of rotation. The scanning mirror rotates continuously in the direction of arrow 68 to scan a regularly updated image onto the screen. The rotational axis of the scanning mirror is parallel to and located a distance Δ from the vertical axis 70 of the folding mirror. The distance Δ and the height of both mirrors are chosen to ensure that all projected rays are accepted by the scanning mirror and clear the folding mirror upon reflection from the scanning mirror. The resulting image can either be viewed directly from a primary viewpoint 72 below the scanning mirror, or a secondary viewpoint 72a outside the curvature of the screen (when using a back-projection screen). Alternatively, as depicted in FIG. 4, the image can be viewed via a reflection from a large collimating mirror 74 placed forward of a rear projection screen, as shown in FIG. 3, and following the geometry shown in FIG. 15. The embodiment of FIG. 3 essentially replaces the multiple projectors 110 of FIGS. 14 and 15 with a single projector and scanning mirror at or near the same location or a better location, so as to provide the same panoramic image.

As with the embodiment of FIG. 1, the optical axis 55 is at a downward tilt angle φ, this angle being selected so as to place the projector at a better location for either the real image display or the collimated wide angle virtual display. The optical axis is oblique to the axis of the scanning mirror so that the scanner can be located at a position other than at the eyepoint or primary viewer location 72 of the panoramic real image display of FIG. 4, and to allow the main lobe of light from a back projection screen to be directed largely toward the eyepoint in the virtual display of FIG. 3. In the embodiments depicted in FIGS. 3–5, the display screens 62 are depicted as being doubly-curved. However, the display system of these embodiments could also be used with a singly-curved display surface, as in the embodiment of FIG. 1. Likewise, the screens could be front- or back-projections screens in the real image displays of FIGS. 1, 2, 4, and 5.

Figure 6A:
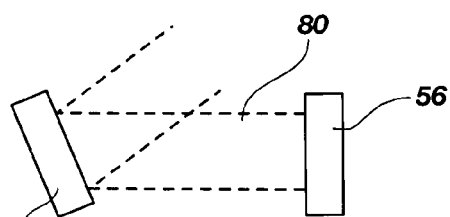
FIGS. 6a–6d are top views of a planar scanning mirror and folding mirror, showing the relative effects of articulation of the folding mirror.
Figure 6C:
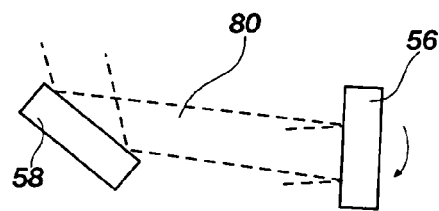
Figure 6B:
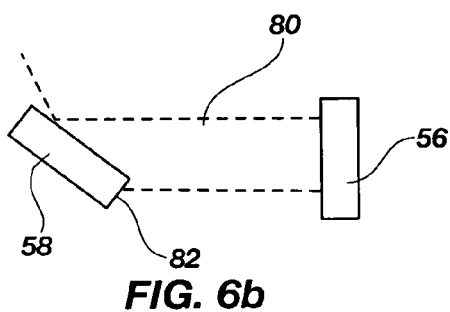

The folding mirror 56 is normally fixed, but can be articulated or oscillated about its vertical axis 70 for a wider field of view, as illustrated in FIGS. 6a–6d. It is understood that a single mirror doubles the incident angle of light upon reflection. When two mirrors are articulated in series, an additional scanning increment is achieved, which may be required for some very wide field-of-view applications. Viewing the top-down views of the folding mirror 56 and scanning mirror 58 in FIGS. 6a–6d, the light bundle 80 reflected off the mirrors converges to a line on the screen 62, but has significant cross section at the mirrors. For small projection angles, all of the light can be collected and reflected by the scanning mirror, as shown in FIG. 6a. For larger angles, the edge 82 of the scanning mirror will begin to block some of the light as shown in FIG. 6b. However, if the folding mirror is rotated slightly relative to the scanning mirror, as shown in FIG. 6c, then all of the light can be directed toward the screen for a wider projection angle.

Figure 6D:
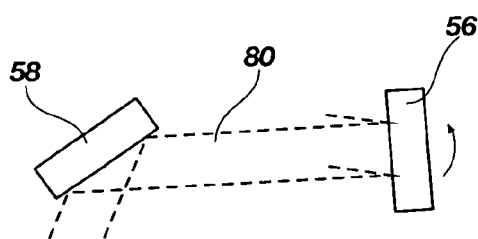

As the scanning mirror 58 rotates through a single scan cycle (i.e. one half rotation), the folding mirror 56 rotates slightly in the opposite direction, following the motion of the scanning mirror. This allows the entire light bundle 80 of the image to strike the mirror at the extreme beginning of the cycle, as shown in FIG. 6c, and at the extreme end of the cycle, as shown in FIG. 6d. When the scanning mirror reaches the end of a single scan cycle, the folding mirror must rapidly revert back to its position at the beginning of the scan cycle, and repeat the process. This arrangement requires the folding mirror to rapidly oscillate between the positions shown in FIGS. 6c and 6d at a rate that is twice the rotational frequency of the scanning mirror. This oscillation is indicated by the two headed arrow 84 in FIGS. 3 and 5. It will be apparent that the rotational axis 70 of the folding mirror is parallel to the rotational axis 64 of the scanning mirror, so that no rotation of the image is produced by the oscillation of the folding mirror. This configuration advantageously allows the system to produce a wider field of projection. The inventors have found that with this configuration a panoramic image 270° wide can be produced using a single projector.

Figure 10:
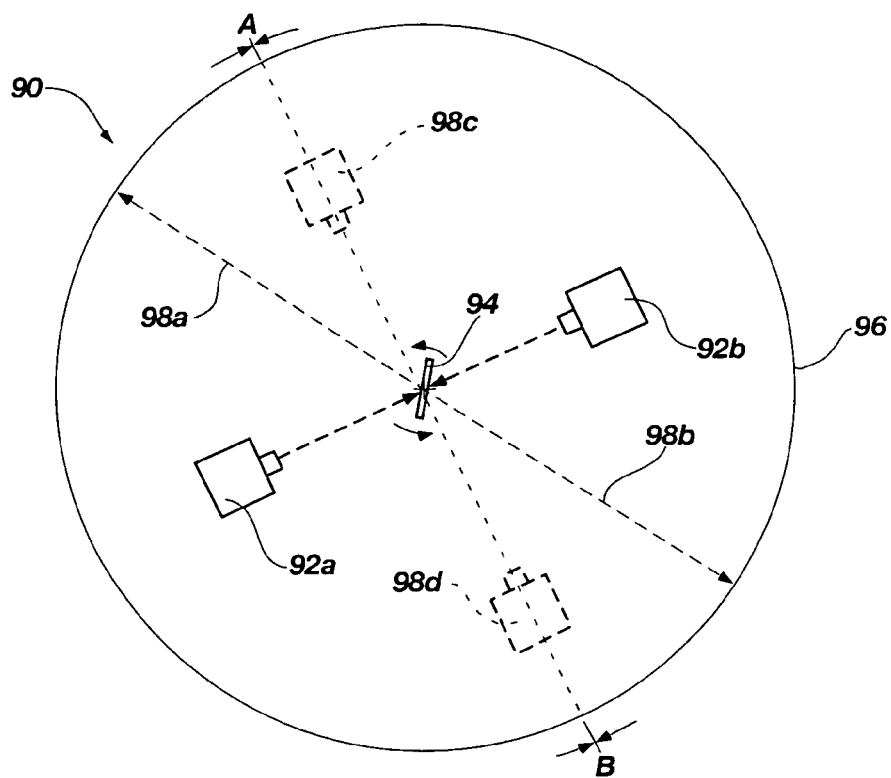
FIG. 10 is a plan view of a panoramic scanner system incorporating two projectors and a planar scanning mirror to produce a 360° image.

Advantageously, the wide angle display system of the present invention can be configured with multiple projectors, which can allow a full 360° scan, and/or accommodate projectors or systems with various limitations. For example, as shown in FIG. 10, a multiple projector system 90 can be provided with two projectors 92 oriented on opposite sides of a single two-sided planar scanning mirror 94. As the mirror rotates, the vertical line of pixels from each projector is scanned across one half of the full circle screen 96 to give a fully-surrounding panoramic image. One projector 92a will project an image 98a across a first half of the screen, from point A to point B, while the other projector scans an image 98b across a second half of the screen from point B to point A. As with the prior systems described above, this system can be used with single- or double-curved, front- or rear-projection screens.

The configuration of FIG. 10 is not limited to two projectors, but can be used with any number of projectors. For example, additional projectors 98c, 98d, can be located so as to further subdivide the portion of the image provided by a single projector. The incorporation of additional projectors can be desirable to increase the resolution of the total image. For example, where each projector provides a maximum pixel density in the horizontal dimension, the pixel density of the total composite image can be increased by using multiple projectors. This technique can be used even if a full-surround image is not desired. For example, with the embodiment of FIG. 1, two projectors could be aimed at the same scanning mirror, each projector offset some angular distance from the other, and each providing half of the panoramic image, though not creating a composite image that fully surrounds the viewpoint.

Multiple projectors can also be used to overcome bandwidth limitations in the image generator (IG). If one IG channel only has the capacity to scan a relatively narrow or lower resolution image at the desired refresh rate, multiple IG channels can be used to provide the desired high-resolution image as a composite of images from several projectors.

Figure 11:
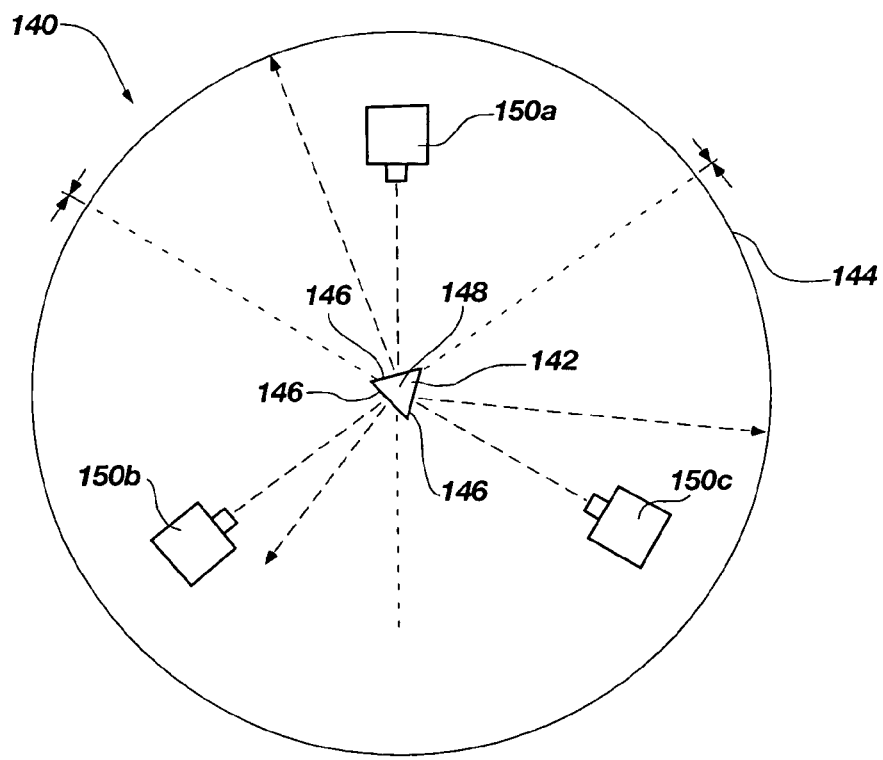
FIG. 11 is a plan view of a panoramic scanner system incorporating three projectors and a polygonal scanning mirror to produce a panoramic display.

Another embodiment of a panoramic projection system 140 employing multiple projectors is shown in FIG. 11. This configuration uses a polygonal scanning mirror 142 to scan the image across the circular screen 144. As shown, the scanning mirror is a triangular shape, having three vertical reflective sides 146. Other shapes can also be used. As the mirror rotates about its vertical axis 148 through a full circle, it sequentially reflects the image from each projector 150a–150c onto a portion of the screen.

Figure 12:
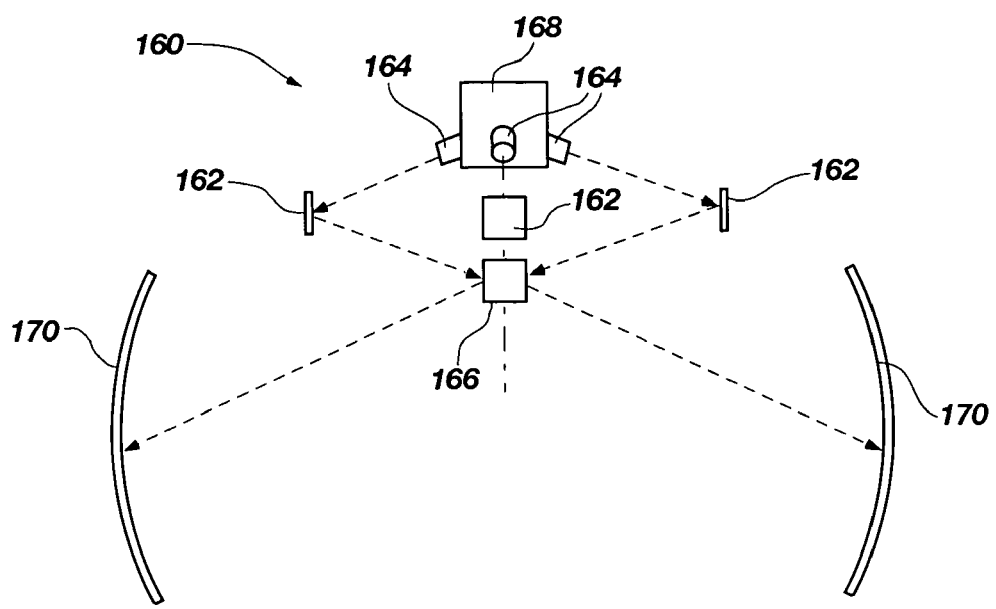
FIG. 12 is an elevational view of a panoramic scanner system incorporating multiple projectors in a single unit, with a folding mirror for each projector, and a single polygonal scanning mirror.

The embodiments of FIGS. 10 and 11 each comprise multiple projectors and a single scanning mirror. However, the advantages of a folding mirror can also be incorporated into a multiple projector system. Referring to FIG. 12, a multi-projector panoramic display system 160 includes a plurality of folding mirrors 162 that are oriented to reflect images from multiple projectors 164 to a single scanning mirror 166. In the example shown, the scanning mirror is a four-sided polygon, and the multiple projectors are disposed in a single housing 168 located directly above the scanning mirror. This configuration allows the relatively bulky projectors to be located in a less conspicuous location, yet still scan the image onto the panoramic screen 170.

The invention provides the advantages of wide angle scanning from an offset projector position. The system advantageously allows projection of an image across a circular arc of more than 180 degrees using a single projection source. As noted above, the various embodiments of the panoramic scanner can be used for both real image and virtual projection systems, using either a front- or back-projection screen that is either singly or doubly curved. The invention can be used for wide angle virtual displays for both civil and military training, and for direct view panoramic displays for deployable military trainers. It may also have application for command/control type displays, or displays for remote control of unmanned air or ground vehicles. The invention may be adapted for helmet-mounted displays as well. Many other uses are also possible. For example, real-image rear-projection panoramic displays can be used for advertising or informational kiosks at trade shows, in a shopping mall, an airport, or a museum. A composite real-time image of the earth from weather satellites could be projected onto the inside of a spherical back-projection screen, and viewed from outside to provide a complete perspective of global weather and geography. Advantageously, with the present invention, horizontal magnification is achieved by mechanical rotation of a very simple and aberration-free optical element (a flat mirror), without the need for an exotic and expensive anamorphic projection lens. The invention also scans over a large field of view, while being mounted away from the viewer location, unlike some head-mounted laser projectors. Also, unlike some other panoramic scanning systems, the present system does not require a second rotating element to act as a derotator.

As noted above, one problem frequently encountered with panoramic display systems, whether real or virtual, is light scattering. The present invention advantageously provides a reflection barrier for panoramic projection systems that reduces light scattering from one part of a panoramic screen to another, thereby reducing the negative effect light scattering and reflections have on the contrast of the image on the screen. Advantageously, it can be employed with mosaic images from multiple projectors, or with single panoramic images projected from a single linear array projector and scanned using a rotating scanning mirror. The system provides benefits when using both single- and double-curved screens, and can be used with front- and rear-projection screens, though it is particularly suited to rear-projection systems.

As shown in FIG. 1, some portion of the light that strikes one area of a curved screen 14 tends to scatter and reflect toward other parts of the screen, as indicated by arrows 198. This problem exists whether the projection is from one or more projectors, or using a scanning mirror system disclosed above. This scattered light tends to wash out the image, and reduce the contrast of the display. Obviously, this adversely affects the quality of the image.

Figure 16:
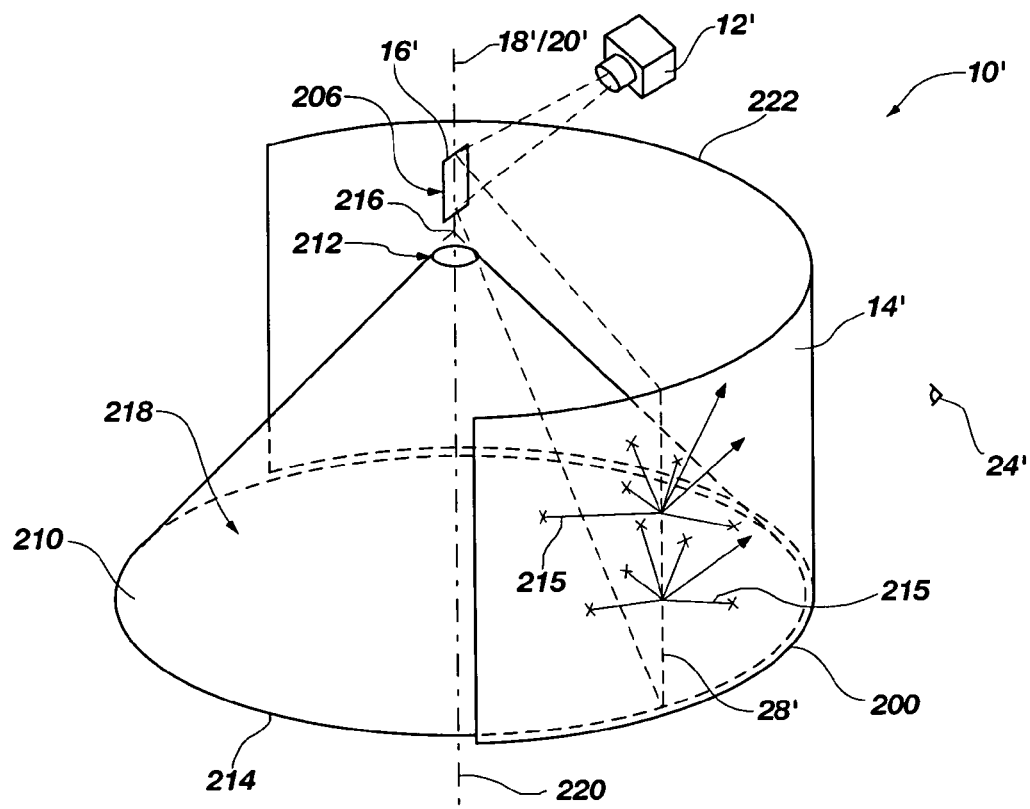
FIG. 16 is a perspective view of a panoramic projection system incorporating a reflection barrier according to the present invention.
Figure 17:
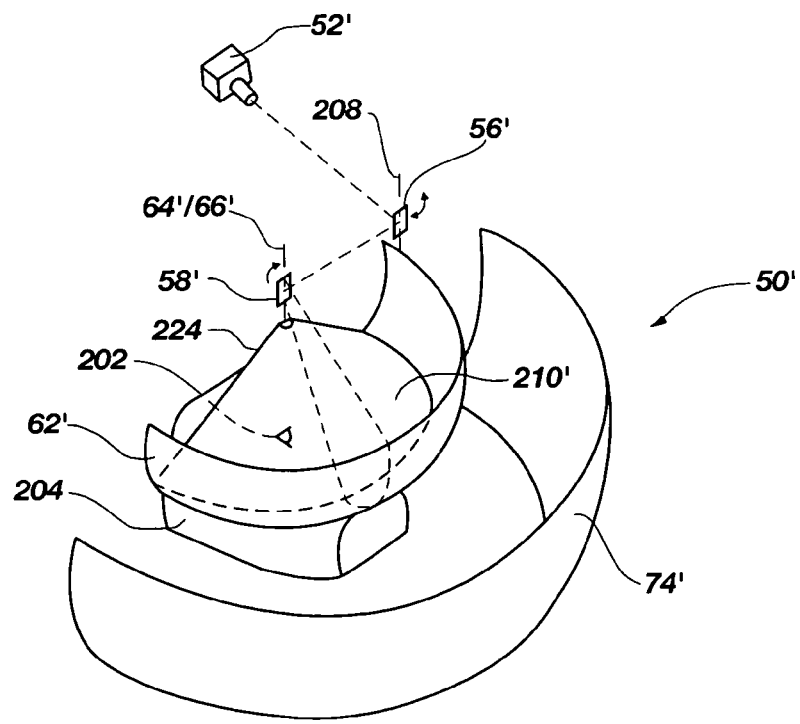
FIG. 17 is a perspective view of a panoramic virtual projection system incorporating a reflection barrier according to the present invention.

Advantageously, the inventors have developed a reflection barrier for panoramic displays that reduces the effects of light scattering on a panoramic screen. Referring to FIG. 16, the invention is shown in connection with a panoramic scanning system like that shown in FIG. 1. The panoramic display system 10' includes a curved projection screen 14', having a bottom 200 and a center of curvature or central axis 18'. The screen is preferably a rear projection screen, directly viewable from a viewer location 24' outside the screen, and may be singly or doubly curved. As shown in FIG. 17, the system may alternatively comprise a virtual display system 50', including a curved mirror 74', configured to reflect a panoramic image from a rear-projection screen 62' to an offset viewing point 202, such as within in a simulator cockpit 204.

The system of FIG. 16 includes a panoramic projection system that is configured to project an image onto the projection screen 14' from a projection point 206 located substantially above the projection screen. It will be apparent that the terms "above", as well as the designation of the "bottom 200" of the screen and other such terms as used herein are relative to the panoramic orientation of the projection system and the screen, and do not necessarily have any relation to any absolute orientation. It will be apparent that the orientation of the system could be inverted from that shown, or disposed in any other position so long as the relative location of the components of the system is as described herein. Thus, the term "above" as used herein could actually mean "below" or "to the side of." Regardless of the orientation of the system, the projection point is offset from the screen toward a side opposite to the edge of the panoramic display called the "bottom" in this description.

The projection system of FIG. 16 may comprise multiple projectors (not shown) disposed near the projection point, configured to project a composite image upon the screen, similar to the prior art multiple projector systems described above, such as that depicted in FIG. 13. Alternatively, and more preferably, the projection system comprises a linear array projector 12', configured to project a vertical line of pixels 28' onto the screen 14' at a refresh rate. The embodiment of FIG. 16 is similar to that of FIG. 1, and includes a rotating scanning mirror 16' disposed substantially at the projection point 206, and configured to rotate about a vertical axis 20' at one half the refresh rate of the linear array projector. The scanning mirror reflects the vertical line of pixels onto the screen at the refresh rate to produce the panoramic image.

As shown in FIG. 17, the projection system may further comprise a folding mirror 56', disposed between the linear array projector 52' and the scanning mirror 58'. As with the embodiments described above, the folding mirror is configured to reflect the vertical line of pixels onto the scanning mirror. The folding mirror allows a different offset location for the projector, and, where the folding mirror oscillates about a vertical axis 208, it can also allow a wider panoramic image to be produced from a single projector.

The panoramic screen 14' includes a vertical axis of curvature 18' that is parallel to and preferably collinear with the rotational axis 20' of the scanning mirror 16'. Disposed within the central space surrounded by the screen is a substantially conically shaped reflection barrier 210 that is oriented upright, with its apex region 212 disposed toward the projection point 206, and its base 214 toward the bottom or base 200 of the screen. Because of its location and its shape, the reflection barrier does not interfere with the projection onto the screen, but advantageously blocks a substantial portion of scattered light from reflecting from one part of the screen to other parts thereof, as indicated by arrows 215.

The conical barrier 210 is slightly truncated, as shown, with its theoretical apex 216 located at or near the center of the scanning mirror 16', but being truncated to provide space for the scanning mirror and its associated structure. This allows the conical surface 218 of the barrier to be substantially parallel to the bottom of the projection path of the image, yet without interfering with the projection of the image or the operation of the scanning mirror. The base 214 of the barrier may be coterminous with the bottom 200 of the screen 14', or may be disposed some distance from it. It will be apparent that it is desirable to locate the surface of the barrier as close to the projection path of the image as possible so as to block as much scattered light as possible.

In one embodiment, the reflection barrier 210 has a vertical axis 220 that is substantially parallel to the vertical axis of curvature 18' of the screen 14'. More particularly, the vertical axis of the conically shaped barrier may be collinear with the vertical axis of the screen. The projection point 206 need not be above the level of the top edge 222 of the screen. However, it will be apparent that, where the cone is taller, it will be able to block a greater portion of scattered light from striking other portions of the screen. However, keystone distortions and other considerations, such as increased moment of inertia for motion systems, also work to limit the height of the conical barrier. The reflection barrier may also be treated to further reduce its reflectivity, such as with the application of an anti-reflective coating, baffles, or optical felt disposed on its surface 218.

Because the reflection barrier 210 occupies the space in the interior of the screen 14', it will be apparent that it would be difficult to view a front-projection screen using this invention. A truncated reflection barrier could be disposed above an interior viewer location for a front-projection screen, but such a barrier would only improve contrast at the top of the screen. Consequently, the invention is preferably used with rear-projection real image systems, with a viewer location 24' outside the screen, as shown in FIG. 16, or with virtual image systems, as in FIG. 17, where the viewer location 202 is located relative to a curved mirror 74' that provides a reflection of an image from a rear-projection screen 62'.

Figure 18:
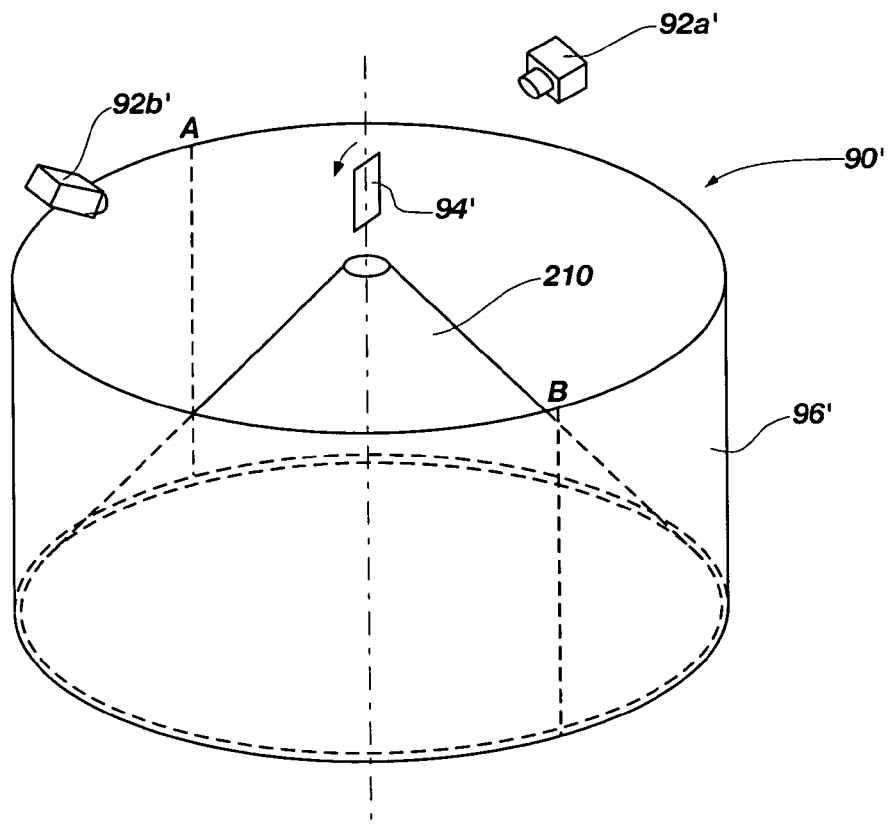
FIG. 18 is a perspective view of a panoramic projection system having multiple projectors aimed at a single scanning mirror and incorporating a reflection barrier according to the present invention.

A reflection barrier can be used with a multiple projector system 90', as shown in FIG. 18. This system includes a 360° panoramic screen 96' and a pair of projectors 92a', 92b' oriented on opposite sides of and aimed at a common rotating scanning mirror 94'. As the mirror rotates, the vertical line of pixels from each projector is scanned across one half of the full circle screen 96' to give a fully-surrounding panoramic image. One projector 92a' will project an image across a first half of the screen, from point A to point B, while the other projector 92b' scans an image across a second half of the screen from point B to point A.

Figure 19:
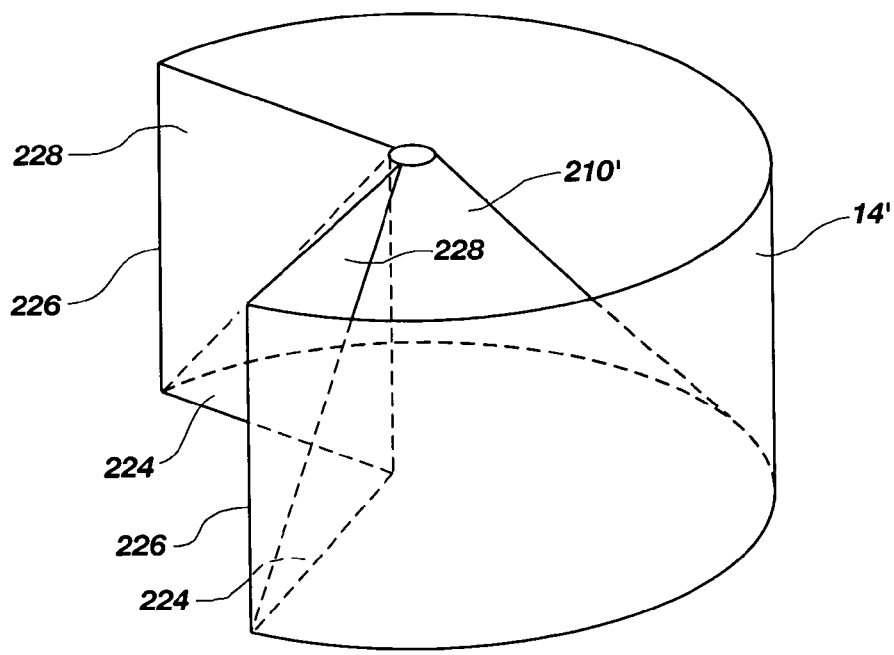
FIG. 19 is a perspective view of a panoramic screen and truncated reflection barrier having baffles for blocking scatter and reflections around the back of the reflection barrier.

As with the prior systems described above, this system can be used with single- or double-curved, front- or rear-projection screens. Where the panoramic screen is not a full-surround (i.e. not 360°), as in FIG. 17, it will be apparent that the conical reflection barrier 210' need not be completely round, but may have a vertically truncated rear side 224. Where the screen defines an arc of more than 180° but less than 360°, as shown in FIG. 19, it will be apparent that scattering and reflections are possible between opposing portions near the back edge 226 of the screen. To prevent this, baffles 228 are provided to enclose the space between the back edge of the screen 14' and the surface of the reflection barrier 210'.

Where a full-surround screen is used, as in FIG. 18, a completely circular conical barrier is desirable. Such a system could be configured with any number of projectors, and could use a flat or polygonal scanning mirror, as discussed above. Likewise, such a system could be configured with one or more folding mirrors, as discussed above.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A panoramic display system, comprising:
   a) a curved projection screen, having a center of curvature and a bottom;
   b) a panoramic projector, configured to project an image onto the projection screen from a projection point located substantially above the projection screen; and
   c) a substantially conically shaped barrier, having a base disposed toward the bottom of the projection screen, and an apex region disposed toward the projection point, configured to block reflections from a region of the screen to at least one other region of the screen.

2. A device in accordance with claim 1, further comprising an anti-reflective treatment disposed on the conically shaped barrier.

3. A device in accordance with claim 2, wherein the anti-reflective treatment is selected from the group consisting of anti-reflective coatings, baffles, and optical felt.

4. A device in accordance with claim 1, wherein the base of the barrier is coterminous with the bottom of the screen.

5. A device in accordance with claim 1, wherein the panoramic screen includes a vertical axis of curvature that is parallel to a vertical axis of the conically shaped barrier.

6. A device in accordance with claim 5, wherein the vertical axis of the conically shaped barrier is collinear with the vertical axis of the screen.

7. A device in accordance with claim 1, wherein the projector comprises multiple projectors disposed near the projection point, configured to project a composite image upon the screen.

8. A device in accordance with claim 1, wherein the projector comprises:
   a) a linear array projector, configured to project a vertical line of pixels at a refresh rate; and
   b) a rotating scanning mirror, disposed substantially at the projection point, configured to rotate about a vertical axis at one half the refresh rate of the linear array projector, and to reflect the vertical line of pixels onto the screen.

9. A device in accordance with claim 8, wherein the projector further comprises a folding mirror, disposed between the linear array projector and the scanning mirror, configured to reflect the vertical line of pixels onto the scanning mirror.

10. A device in accordance with claim 8, wherein the panoramic screen includes a vertical axis of curvature that is parallel to a vertical axis of the conically shaped barrier and parallel to the vertical axis of the scanning mirror.

11. A device in accordance with claim 1, wherein the screen is a rear-projection screen.

12. A device in accordance with claim 11, further comprising a curved mirror, configured to reflect a panoramic image from the screen to an offset viewing point.

13. A device in accordance with claim 1, wherein the screen is doubly curved.

14. A device in accordance with claim 1, wherein the projector comprises:
   a) a linear array projector, configured to project a vertical line of pixels at a refresh rate; and
   b) a rotating scanning mirror, disposed substantially at the projection point, configured to rotate about a vertical axis at one half the refresh rate of the linear array projector, and to reflect the vertical line of pixels onto the screen.

15. A device in accordance with claim 1, wherein the curved projection screen defines an arc of greater than 180° and less than 360°, and further comprising a baffle, extending between a rearward edge of the screen and the reflection barrier, configured to block reflections between rearward portions of the screen.

16. A reflection barrier for a panoramic projection system, the system including a curved projection screen, having a center of curvature and a bottom, and a panoramic projector, configured to project an image onto the projection screen from a projection point located substantially above the projection screen, the barrier comprising:
   a) a substantially conically shaped barrier, having a base disposed toward the bottom of the projection screen, and an apex region disposed toward the projection point, configured to block reflections from a region of the screen to at least one other region of the screen.

17. A device in accordance with claim 16, further comprising an anti-reflective treatment disposed on the conically shaped barrier.

18. A device in accordance with claim 17, wherein the anti-reflective treatment is selected from the group consisting of anti-reflective coatings, baffles, and optical felt.

19. A device in accordance with claim 16, wherein the projector comprises multiple projectors disposed near the projection point, configured to project a composite image upon the screen.

20. A device in accordance with claim 16, wherein the base of the barrier is coterminous with the bottom of the screen.

21. A device in accordance with claim 16, wherein the panoramic screen includes a vertical axis of curvature that is parallel to a vertical axis of the conically shaped barrier.

22. A device in accordance with claim 21, wherein the vertical axis of the conically shaped barrier is collinear with the vertical axis of the screen.

23. A device in accordance with claim 16, wherein the curved projection screen defines an arc of greater than 180° and less than 360°, and further comprising a baffle, extending between a rearward edge of the screen and the reflection barrier, configured to block reflections between rearward portions of the screen.

24. A panoramic display system, comprising:
   a) a curved projection screen, having a bottom and a center of curvature;
   b) a projection point, located substantially above the projection screen;
   c) a panoramic projector, configured to project an image onto the projection screen, the projector including:
      i) a linear array projector configured to project a vertical line of pixels at a refresh rate; and
      ii) a rotating scanning mirror, disposed substantially at the projection point, configured to rotate about a vertical axis at one half the refresh rate of the linear array projector, and to reflect the vertical line of pixels onto the screen; and d) a substantially conically shaped barrier, having a base disposed toward the bottom of the projection screen, an apex region disposed toward the projection point, and a vertical axis that is substantially collinear with the center of curvature of the screen, the barrier being configured to substantially block reflections from a region of the screen to at least one other region of the screen.

* * * * *